Fig. 1

INVENTOR.
Thomas R. Baker and
Richard V. Pagendarm
BY Howard G. Russell
their ATTORNEY Aug. 29, 1961 T. R. BAKER ET AL 2,997,929
DEVICE FOR COMPRESSING GLUED AREAS OF FOLDING BOXES
Filed March 6, 1959 7 Sheets-Sheet 2

INVENTOR.
Thomas R. Baker and
Richard V. Pagendarm
BY
Howard G. Russell
their ATTORNEY

INVENTOR.
Thomas R. Baker and
Richard V. Pagendarm
BY Howard G. Russell
their ATTORNEY

Fig. 7

INVENTOR.
Thomas R. Baker and
Richard V. Pagendarm

Fig. 8.

United States Patent Office

2,997,929
Patented Aug. 29, 1961

2,997,929
DEVICE FOR COMPRESSING GLUED AREAS OF FOLDING BOXES
Thomas R. Baker, Los Altos, and Richard V. Pagendarm, San Mateo, Calif., assignors to Baljak Corporation, Wilmington, Del., a corporation of Delaware
Filed Mar. 6, 1959, Ser. No. 797,806
6 Claims. (Cl. 93—51)

This invention relates to the art of making folding boxes by folding an appropriately shaped box blank and adhesively securing certain of its portions together in box forming position.

Conventional box making machines comprise basically a conveyor which moves an initially flat box blank past adhesive applying and folding devices, whereafter the box passes into a pressure section in which the glued portions are maintained under pressure until the adhesive bond has become sufficiently strong to permit the box to be discharged from the machine. These machines are relatively extended and occupy a large floor space.

It has been proposed to reduce the length of the box making machine by the use of a box folding mechanism of the plunger and die type, preceded by a conventional conveyor portion by which the box blanks are moved past glue applicators. After application of adhesive the blanks are deposited in the plunger and die mechanism, are grasped by the plunger and pushed into the die, whereby the blank is folded about the plunger in box form. The plunger forms a mandrel or block which moves the box between pressure plates which apply pressure on the adhesively connected portions of the blank.

It has been proposed to apply the required pressure by rotating cams or disks which force the pressure plates against opposite box walls constructed of at least two thicknesses of board adhesively connected by glue. These mechanical pressure applicators require very accurate adjustment in order to apply appreciable pressure to the glued areas and are easily damaged if, by accident, two blanks cling together and are fed into the plunger and die mechanism resulting in the formation of box walls which are twice as thick as under normal conditions. The forces which build up in the compression mechanism under such circumstances are tremendous and often lead to extensive damage to the machine.

A further disadvantage of the mechanical compression mechanism is that the resulting force of compression is a function of the thickness of the board so that even minor changes in the caliper of the board lead to major changes in the applied pressure. If the board thickness is slightly above normal, the machine runs very hard and noisy as a result of excessive pressure, whereas board of less than normal caliper results in reduction of the compressive force and defectively glued boxes. A further disadvantage inherent in mechanical pressure applying devices is the presence of moving, generally rotating, parts of considerable mass which cannot be stopped suddenly, should the need arise, and which tend to set up oscillations, particularly if resilient elements such as springs are incorporated in the mechanism.

In order to produce boxes at a rapid rate, it is necessary to apply forces of compression of a great magnitude of the order of several tons. The application is brief, must be accurately timed and should be independent of variations in the board caliper.

The present invention provides a device for exerting compressive force on adhesively connected areas of folding boxes which meets the aforementioned requirements and offers numerous other valuable features.

For example, difficulties arise if a box supported on the mandrel or plunger and to be compressed between opposite pressure exerting elements, is struck by one element prior to application of an equal force from the opposite direction. Since the force applied by either member is of the order of several tons, a severe lateral blow is imparted to the plunger unless the application of force is accurately simultaneous in both directions. Repeated, unequal blows lead to fatigue of elements of the plunger mechanism and consequent failure. The invention provides for a mechanism by which the pressure applying members are so interconnected and guided that the distance between one pressure applying member on the one side of the plunger is always equal to the distance of the other pressure applying member on the opposite side of the plunger so that equal forces are applied simultaneously to opposite sides of the plunger.

These and various other features and advantages of the invention will appear more fully from the detailed description which follows accompanied by drawings showing, for the purpose of illustration, a preferred embodiment of the invention. The invention also resides in certain new and original features of construction and combination of elements hereinafter set forth and claimed. Although the characteristic features of this invention which are believed to be novel will be particularly pointed out in the claims appended hereto, the invention itself, its objects and advantages, and the manner in which it may be carried out may be better understood by referring to the following description taken in connection with the accompanying drawings forming a part of it, in which:

In the following description and in the claims various details will be identified by specific names for convenience. The names, however, are intended to be generic in their application. Corresponding reference characters refer to corresponding parts in the several figures of the drawings.

The drawings accompanying, and forming part of, this specification disclose certain specific details of construction for the purpose of explanation of broader aspects of the invention, but it is understood that the constructional details may be modified in various respects without departure from the principles of the invention and that the invention may be incorporated in other structural form than shown.

Figure 1:
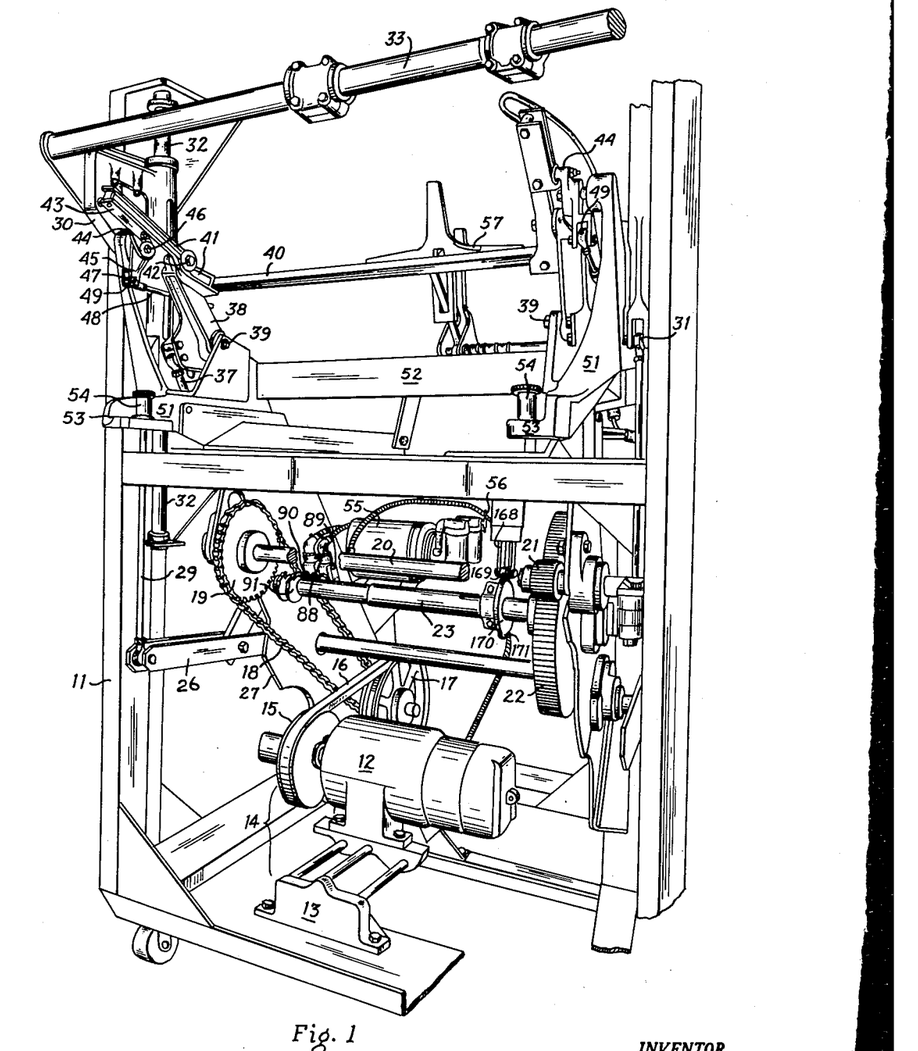
FIG. 1 is a perspective view of a partially assembled machine in which a device for exerting compressive force on glued areas of folding boxes may be installed.

FIG. 1 shows a box gluing and forming machine in a state of partial assembly so that portions of the drive may be seen more clearly. The machine comprises a framework 11 supporting a motor 12 on an adjustable mount 13. The mount 13 forms an element of a variable speed drive 14 whose other major element is a V-belt pulley 15 of variable effective diameter.

A V-belt 16 extends over a driven pulley 17 carrying a sprocket gear (not visible) from which a chain 18 extends to a sprocket gear 19 on a pinion shaft 20.

When the speed of the drive is reduced by reducing the effective diameter of the pulley 15 the resulting slack of the belt 16 is taken up by moving the motor forward towards the observer on the adjustable mount 13.

Figure 2:
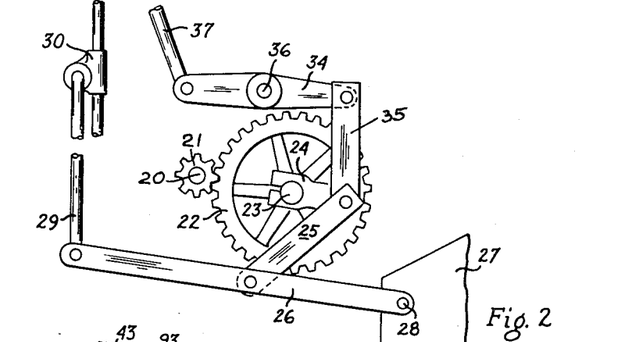
FIG. 2 is an elevational view of a portion of the drive mechanism of the machine of FIG. 1.

The pinion shaft 20 carries a pinion 21 meshing with a large gear 22 on a crank shaft 23 carrying a crank 24 on either end. The crank is not visible in FIG. 1 but is shown in FIG. 2.

The mechanism about to be described is mounted on both sides of the machine and comprises a crank 24 connected by a lower link 25 to a lower oscillating arm 26 whose one end is pivoted to a plate 27 of the framework at 28 and whose other end is pivotally connected to a connecting rod 29. The upper end of the connecting rod 29 is pivotally connected to a cross head member 30 at 31 (see FIG. 3). The cross head member 30 is vertically slidable on a vertical column 32 of the framework and carries a plunger drive bar 33 extending across the front of the machine.

The crank 24 (FIG. 2) is further connected to an oscillating lever 34 by an upper link 35. The oscillating lever 34 is pivotally mounted to the framework intermediate its ends at 36 and moves a connecting rod 37 which actuates a bell crank lever 38. The lever 38 is tiltable on a fixed pivot 39 on the framework and forms an element of a blank feeding mechanism disclosed in greater detail in the prior Patent No. 2,805,060 to Lefief, dated September 3, 1957.

Briefly, the blank feeding mechanism comprises an oscillating gripper bar 40 supported at both ends by identical lever mechanisms, more particularly a pair of double armed gripper arms 41 pivoted at 42 to the first bell crank levers 38. The end of the gripper arm opposite the gripper bar is formed as a track or guideway 43 of U-shaped cross section within which a pivot 44 on one arm of a second bell crank lever 45 is both rotatable and free to slide longitudinally. The second bell crank lever 45 is pivotally mounted at 46 and its other arm 47 is linked to a connecting rod 48 at 49. The connecting rod 48 has its other end pivoted to the first bell crank lever 38 at 50.

The pivots 39 and 46 are supported by castings 51 which form the sides of a substantially U-shaped framework, viewed from above. The back of the framework is formed by a magazine supporting plate 52 whose ends are bolted to the back of the castings 51. The U-shaped framework is open towards the observer and has front arms or extensions 53 adapted to support a box forming die and box compression mechanism to be held in place by knurled nuts 54.

FIGURE 1 shows further a motor driven vacuum pump 55 from which a suction line 56 extends including flexible tubing leading to suction cups of the blank feeding mechanism and other pneumatically operated elements of the machine. The feeding mechanism is not yet installed in the machine as shown in FIG. 1, but portions of the flexible tubing of the suction line are visible at 57 above the lever mechanism on the right as well as above the oscillating gripper bar 40 near the center. The operation of the illustrated mechanism will now be described.

The motor 12 drives the driven pulley 17 at a speed determined by the setting of the variable speed drive, and the driven pulley 17 drives the pinion shaft 20 through the chain 18. The pinion 21, in turn, meshes with the gear 22 and turns the crank shaft 23 carrying a crank 24 on either end (FIG. 2). The crank produces oscillation of the lower oscillating arm 26 as a result of which the cross head members 30 on either side, together with the plunger drive bar 33 which connects them, move up and down.

Timed with respect to the motion of the plunger drive bar is the motion of the oscillating gripper bar 40 which in the completed machine carries suction cups for picking up flat blanks at a magazine and transporting them to a position above the forming die. The motion of the oscillating gripper bar 40 is complex and is disclosed in detail in the above mentioned Lefief patent.

Figure 5:
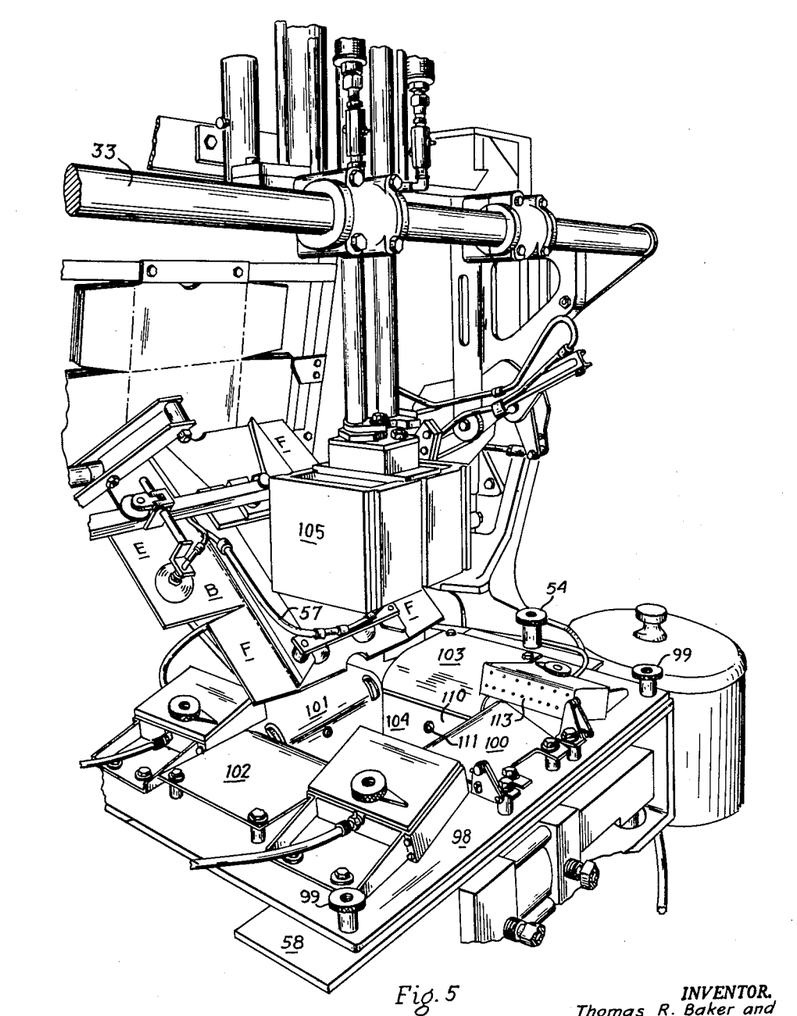
FIG. 5 is a perspective view of the box forming and box compressing portion of the machine of FIG. 1 and illustrates the phase of its operation in which a flat blank approaches the adhesive applying and box forming mechanism.

Briefly, the motion of the bar 40 is first substantially horizontal towards the observer during which phase a blank standing on edge is separated from a stack of blanks behind it. After the first substantially translatory motion, the bar 40 performs a rotary motion about the pivots 42 whereby the blank is turned substantially 90 degrees, or less, until it is horizontal. The second phase of the motion of the bar 40 is followed by a third phase during which the blank is moved in a substantially vertical direction, parallel to itself, whereafter the bar 40 stops and the feeding mechanism releases the blank. The bar then moves through a return cycle, first upward and away from the blank, then on an arc into the position in which it is shown in FIG. 1 and then away from the observer towards the stack of blanks in order to pick up the next blank. The location of the magazine is best seen in FIG. 3, and FIG. 5 shows the blank and bar 40 during the rotary phase of the motion.

With an understanding of the basic construction and operation of the drive mechanism it will now be easy to follow the construction and the operation of the specific mechanisms for handling the blank, applying adhesive thereto, folding it into box shape and subjecting the shaped box to compression to set the adhesive sufficiently to permit the box to be discharged.

The box forming mechanism comprises a forming die including means for expanding and contracting it for the purpose of first admitting a formed box into the throat of the die and then subjecting it to compressive force.

Figure 3:
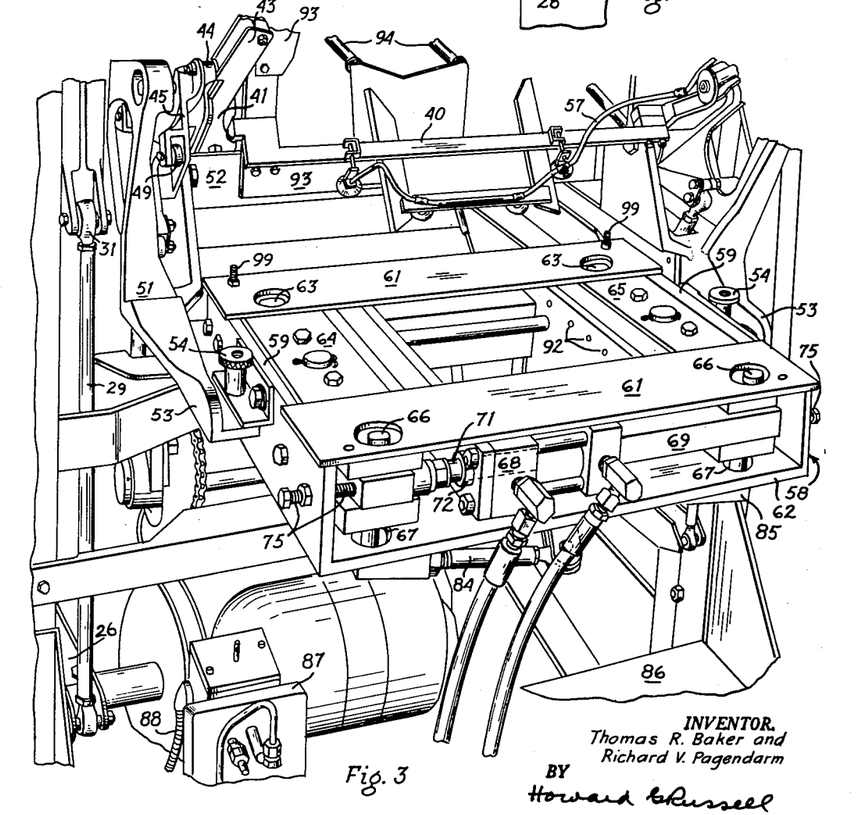
FIG. 3 is a perspective view of the box compressing device in the state of partial assembly.
Figure 4:
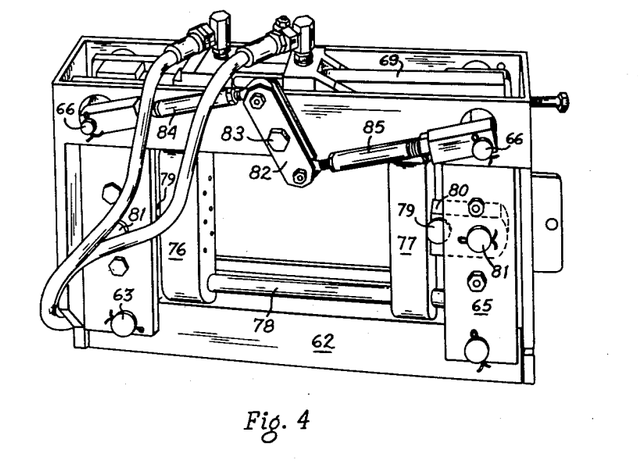
FIG. 4 is a perspective bottom view of the box compressing device of FIG. 3.

The die mechanism is best explained by first turning to FIG. 3 showing the mechanism in a state of partial assembly, installed in the machine, and to FIG. 4 showing the compression mechanism standing up on end so that its construction and operation can be followed.

Referring first to FIG. 3, the compression unit comprises a heavy box frame 58 having side members 59 with flanges 60 resting on the front arms 53 of the castings 51 and held in place by the knurled nuts 54. The side members 59 are connected by transverse top plates 61 and bottom plates 62 welded thereto, the whole structure being sufficiently strong to withstand forces of the order of several tons. Two pivot pins 63 extend through the box frame in the back and pivotally support jaw arms 64 and 65, the other ends of which carry front pins 66 extending through apertures 67 in the transverse bottom plate 62.

A hydraulic cylinder 68 provided with an extension 69 is pivotally connected to the right jaw arm 65 by means of the right front pin 66. A piston 70 is slidable in the cylinder and its piston rod 71 extends through a stuffing box 72 to the outside. The piston rod is pivotally connected to the left jaw arm 64 by the left front pin 66.

The piston subdivides the cylinder space into a first chamber 122 to which a flexible pressure line 73 leads and a second chamber 123 (see also FIG. 7) to which a flexible pressure line 74 extends. It is immediately apparent that excess pressure in line 74 causes the piston to travel to the right as a result of which the jaw arms 64 and 65 are drawn together, whereas excess pressure in the pressure line 73 causes the piston to travel to the left and the jaw arms to move apart. A pair of stroke limiting screws 75 are provided for limiting the opening movement.

A pair of jaws 76, 77 are mounted for parallel movement on rods 78 in the box frame. Only the rear rod is visible, the front rod being hidden under the transverse plates. The jaws 76 and 77 have substantially cylindrical extensions 79 secured thereto which are grasped by links 80. Each link has a closed end through which the center pin 81 in each jaw arm extends and an open end which grasps the cylindrical extensions 79. By an exchange of a short link by a longer link the spacing of the jaws 76 and 77 may be reduced to handle a box of small size, whereas replacement of the link 80 by a shorter link enlarges the space between the jaws 76 and 77 to accommodate a larger box.

The mounting of the hydraulic cylinder within the box frame 58 is a floating mounting insuring application of equal force to both jaws 76 and 77.

A floating mounting, however, does not automatically insure simultaneous application of force in both directions in that force may be applied first by one jaw and then by the other. This would subject a box supporting plunger to a one-sided blow which, if repeated, impairs the mounting of the plunger and leads to destruction.

To prevent this motion equalizing means are provided which interconnect both jaws in such a way that the distance of one force applying surface on one jaw from one side of the box, or the central axis, is equal to the distance of the other force applying surface from the opposite side of the box, or the central axis.

The motion equalizing mechanism may assume various forms, incorporating the principle that the motion of one jaw with respect to the framework is related to the motion of the other jaw in relation to the framework. For this purpose a movable element is mounted on the framework suitably connected to the jaws or levers by connecting means.

As shown in the illustrated example, the movable element may perform a pivotal motion, and have the form of a pivotal element 82 mounted to the box frame at 83. Connecting rods 84 and 85 extend from the centering element to the bottom ends of the front pins 66, as clearly visible in FIG. 4. The resulting linkage centers the motion of both arms 64 and 65 with respect to the framework 58 by reason of interconnection of the arms through the connecting rods 84 and 85, and the movable element 82 which, itself, is guided with respect to the framework 58. Both the opening and the closing movement of the jaws are thus positively controlled and maintained equal for both jaws.

The jaws 76 and 77 have tapped holes 92 into which mounting bolts 111 may be screwed for attaching pressure plates 110 matching the size of the wall panels of the box to which pressure is to be applied. The pressure plates are preferably slightly smaller than the wall panels of the box, so that any excess adhesive which is squeezed out of the glue joint will not be deposited on the plates and transferred to subsequent boxes.

A hydraulic pump 118 driven by a separate electric motor 119 of approximately 2 horsepower size is enclosed in a pump housing 86 shown in FIG. 3 and a hydraulic line 120 extends from the pump to a hydraulic control valve 87 combined with a solenoid actuator 121 from which a cable 88 extends through a control switch 89 (FIG. 1). The control switch includes a movable arm on which a roller 90 is mounted resting on the periphery of a control arm 91 on the crank shaft 23.

The control cam 91 operates the control switch 89 in such a way that the hydraulic control valve 87 first admits high pressure through pressure line 74 to move the jaws 76 and 77 together, whereafter the control valve 87 is reversed by the switch 89 to apply lower pressure through the line 73 to move the jaws apart.

FIG. 3 also shows an empty magazine gate 93 attached to the magazine supporting plate 52. Box blank supporting bars 94 extend from the magazine gate to the rear. The bars support flat box blanks standing on edge and the magazine gate 93 is so dimensioned that it retains the frontmost blank by a slight marginal overlap sufficient to hold the blanks in place, but permitting withdrawal of blanks, one at a time, by the blank feeder which includes suction cups 95. The suction cups are mounted on a feeder frame 96 including lateral bars 97 attached to the feeder bar 40. The previously mentioned flexible tubing 57 carries vacuum to the cups 95. The magazine construction is disclosed in detail in the Patent 2,642,285 to Baker et al. of June 16, 1953.

Figure 6:
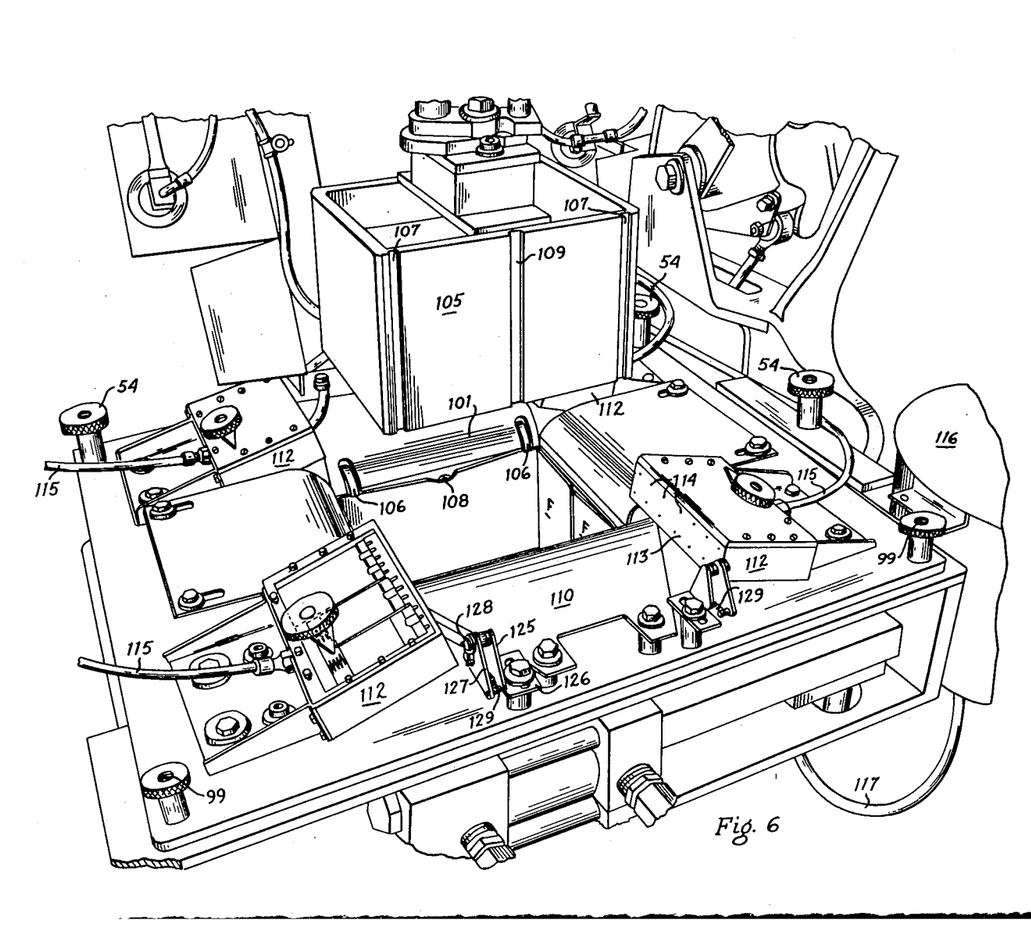
FIG. 6 is a perspective view of the box forming and compressing mechanism after application of force to the completed box.

FIGS. 5 and 6 illustrate the plunger and die mechanism fully assembled, in condition for operation.

A die frame 98 is mounted on the box frame 58 by four corner bolts 99, carrying knurled nuts 54. The die frame is provided with curved front and rear die plates 100 and 101, respectively, for folding the front panel and the back panel of the folding box, and side plates 102 and 103 for folding the end panels of the box blank into box forming position. All four plates have downwardly curved lips defining a substantially rectangular die throat 104 above which an appropriately shaped plunger 105 is mounted.

The plunger 105 is supported on the plunger drive bar 33 by a pneumatic mechanism later to be described. At this point it is sufficient to state that vertical movement of the bar 33 causes the plunger 105 to move into and out of the die throat in timed intervals.

The front and rear die plates 100 and 101 have slots in them through which spring urged stripper fingers 106 protrude whose purpose it is to prevent a formed box from being withdrawn upwardly when the plunger 105 moves out of the die. The fingers 106 normally protrude into the rectangular throat space, but may be pushed back by a box blank entering the throat. The plunger is appropriately recessed at its front and rear surfaces as shown at 107 to clear the stripper fingers in the event the plunger moves into and out of the die without the blank and to prevent the fingers from catching the plunger during its return stroke in normal operation.

The front and rear surfaces of the die carry opposed box wall deflectors 108 which, in the illustrated form of the machine, have the shape of a spring loaded ball. Corresponding vertical grooves 109 in the plunger body provide a clearance between the box wall deflectors and the plunger. The deflectors bow in the front and rear walls of a completed box immediately after withdrawal of the plunger so that the distance between the bowed-in portions of the front and rear walls becomes less than the corresponding dimension of the bottom panel of the box next to be formed. As a result, the next box seats on the top edge of the bowed-in wall portions of the last formed box and causes the last formed box to be ejected from the die.

FIG. 6 illustrates the bowing in of the box, the action of the stripper fingers 106 and also shows details of the construction of the die.

Glue heads 112 are mounted at the four corners of the die. Each head is mounted at an angle with respect to the surface of the die frame 98 and includes a front plate 113 having a plurality of discharge apertures 114 arranged in a pattern. Each discharge aperture 114 is adapted to discharge a certain volume of adhesive which is supplied to the hollow interior of the glue head by an adhesive supply duct 115. A reservoir 116 contains liquid adhesive which is withdrawn from the reservoir through a duct 117 leading to a glue feeding device, preferably in the form of a positive displacement pump which then pumps adhesive under pressure through the adhesive supply ducts to the several glue heads.

The adhesive applicator forms the subject matter of a separate copending application Serial No. 797,792, filed March 6, 1959.

The die frame 98 further supports movable catches 125, each catch comprising a base bracket 126 supporting a latch 127 on a pivot 128, the latch being normally urged towards the throat of the die by a spring 129. The catches serve to hold a blank securely above the throat of the die after the blank is deposited by the blank feeder so that the blank does not change its position by reason of air drafts, vibration, etc., during the approach of the plunger 105.

FIG. 5 shows the plunger 105 during its upstroke and also shows the feeder mechanism moving a blank B towards the die throat 104. The feeder deposits the blank above the die throat in a substantially horizontal position and presses the blank into contact with the horizontal portions of the plates 100 and 101 as a result of which the glue flaps F at the four corners of the blank assume an upwardly slanting position, substantially parallel to the front plate 113 of the glue applicators 112.

In this position the blank is locked by the catches 125, the feeder releases the blank and returns to pick up the next blank and to move out of the way of the plunger 105 which then descends to press the blank into the die throat 104.

FIG. 6 shows that in the folding of the blank the glue flaps F are infolded first and that the end panels E of the blank are folded thereover. The end panels E therefore lie face to face with the pressure plates 110.

When the plunger 105 reaches its lowest position, it comes to rest momentarily. At this moment the control valve 87 is actuated by its solenoid actuator 121 and admits fluid under pressure into the chamber 123 of the hydraulic servo-motor 68, 70. The pressure which is applied is of the order of 2000 lbs. per square inch, applying a force of the order of five to six tons at the jaws 76 and 77 carrying the pressure plates 110. The applied pressure causes the adhesive to be distributed over the flaps F as a very thin film which begins to set immediately due to the fact that the amount of solvent to be absorbed by the board per unit of area is very small. Under these conditions the adhesive becomes highly tacky immediately, although the application of pressure is quite short and lasts only a fraction of a second.

The travel of the jaws is small and is regulated by an appropriate setting of the stroke limiting screws 75 shown in FIG. 3.

The stroke centering device, more particularly the centering lever 82 and the connecting rods 84 and 85, insures simultaneous application of the force by both jaws of the compression unit, so that the plunger is not subjected to a one-sided lateral blow.

Although the application of compressive force during a period of the order of one-fifth of a second is satisfactory, it is preferred to maintain the force as long as is consistent with the rate of operation of the machine.

From the previous description of the drive mechanism it became apparent that the drive bar 33 moves up and down continuously and never comes to rest except at the return points at the ends of the up and down stroke, respectively. It is not practicable to arrest the plunger drive bar during the period of application of compressive force due to the mass of the mechanism which would have to be stopped and then accelerated from rest.

Figure 8:
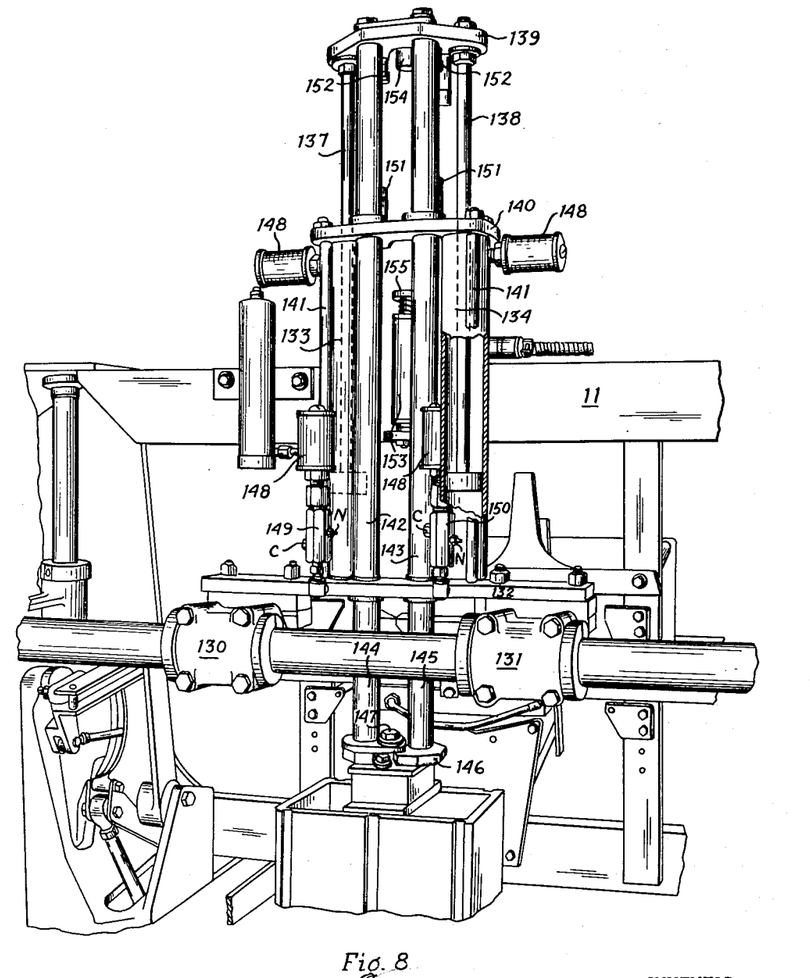
FIG. 8 is a perspective view of a pneumatic actuating mechanism between the drive bar and the plunger proper.

For this reason a pneumatic drive mechanism is provided which suspends the plunger from the drive bar and permits the drive bar to move, while the plunger is momentarily arrested by reason of its being clamped between the jaws of pressure plates of the compression unit. The pneumatic mechanism forms the subject matter of a separate copending application of S. J. Hoyrup, Serial No. 797,676, filed March 6, 1959, Patent 2,997,928, dated August 29, 1961. The major elements of the mechanism essential to an understanding of the function of the mechanism are shown in FIG. 8 and will now be described.

The plunger drive bar 33 (FIG. 8) carries two brackets 130 and 131 on which a common base plate 132 is mounted. The base plate 132 carries two vertical cylinders 133 and 134, each containing a piston 135 and 136 whose piston rods 137 and 138 extend through the top of the cylinders and are connected by a piston plate 139.

The top ends of the cylinders 133 and 134 are held in place by a top plate 140 which is rigidly connected to the base plate 132 by spacer rods 141. Two slide bearing sleeves 142 and 143 are also held between the base plate 132 and the top plate 140. Plunger rods 144 and 145 extend slidably through the sleeves 142 and 143 and carry a plunger plate 146 at their lower ends. The plunger 105 is secured to the plunger plate 146 by a bolt 147.

The pistons 135 and 136 divide the cylinders into upper chambers and lower chambers, the upper chambers being in communication with the atmospheric air through air filters 148 which keep out dust. The lower chambers are in communication with the atmosphere through similar filters 148. Valve assemblies 149 and 150 are interposed between the lower chambers and the atmosphere, the assembly 150 being mounted upside down with respect to the valve assembly 149.

Each valve assembly comprises basically a housing tapped at both ends for threaded connection with appropriate fittings. Intermediate its ends the housing is divided by an internal cross wall not shown in the drawings. The internal wall has two apertures through which the upper portion of the housing may communicate with the lower portion. One of these apertures is variable in size by a needle valve N, the other is controlled by a check valve C. The needle valve permits restricted passage of air through the valve assembly in the direction of the axis of the valve housing. The check valve permits relatively free flow of air in one direction, but seals its passage when the air flows in the opposite direction.

As a result of the inverted mounting of valve assembly 150 with respect to the assembly 149, atmospheric air enters freely into the lower chamber of the cylinder 134 when its piston moves upwardly, whereas downward motion of the same piston meets with resistance because air being forced out of the lower chamber causes the check valve C to close and can escape only through the restricted needle valve N. Thus downward motion of the piston within the right cylinder 134 is restrained whereas upward motion is unrestrained.

The reverse applies with respect to the piston within the left cylinder 133. Upward piston motion, causing air to enter its lower chamber, is restrained because air can only enter through its needle valve N while its check valve C is closed. Downward motion, however, causing air to escape from the lower chamber is unrestrained because the air escapes freely through the check valve C.

An adjustment of the needle valve N permits any desired degree of restraint to be imposed on the upward motion and the downward motion of the pistons with respect to the cylinders and thus upon the plunger 105 with respect to its drive bar 33. The restraint is of an elastic nature due to the compressibility and the expansibility of air.

In order to prevent the pistons from bottoming in the respective cylinders 133 and 134, a pair of buffers 151 are mounted on the top plate 140 on which stops 152 on the piston plate 139 may seat.

It was previously mentioned that the downward motion of the plunger 105 is arrested in the position in which compressive force is exerted on the folding box.

In order to prevent sudden stops of the plunger from producing a corresponding impact on the drive a hydraulic snubber mechanism is provided comprising a snubber cylinder 153 mounted on the framework 11 on the machine and a striker pad 154 on the piston plate 139. When the striker pad 154 seats on the snubber head 155, the snubber arrests the plunger 105 gently.

It is now readily seen that once the plunger 105 has reached its lowest position in the throat of the folding die, and is temporarily clamped by reason of the action of the compression unit, the plunger drive bar 33 may start its upward motion without delay. During the upward motion of the bar 33 the cylinders 133 and 134 move in an upward direction with respect to their pistons which are at rest by reason of being attached to the plunger. During this motion air is compressed in the lower chamber of the cylinder 134 and escapes only slowly because of the restriction of air flow by the needle valve N of the assembly 150. This compressed air represents a resilient driving force which drives the plunger 105 upwardly as soon as the compressive force by the compression unit is released. This action is gentle and continues until the pistons are raised so far that the stops 152 seat on the buffers 151, whereafter the upstroke of the plunger 105 continues at the same rate as the upward motion of the drive bar 33.

When the drive bar 33 comes to rest in its upper return position, the plunger 105 is permitted to continue traveling in an upward direction for a certain distance, thereby separating the stops 152 from the buffers 151 while the drive bar 33 moves downwardly. The plunger 105 comes to rest in a top position and its motion is then reversed by the creation of a vacuum in the left cylinder 133 into which air can enter only slowly because of the restriction to air flow imposed by its needle valve N.

The mechanism for actuating the glue pump comprises a cam 170 on the crank shaft 23. The cam has an elevated portion 171 which lifts a follower 168 whose roller 169 runs on the periphery of the cam. The follower actuates the pumping member or plunger of the glue pump (not shown), once for each revolution of the crank shaft 23.

Figure 7:
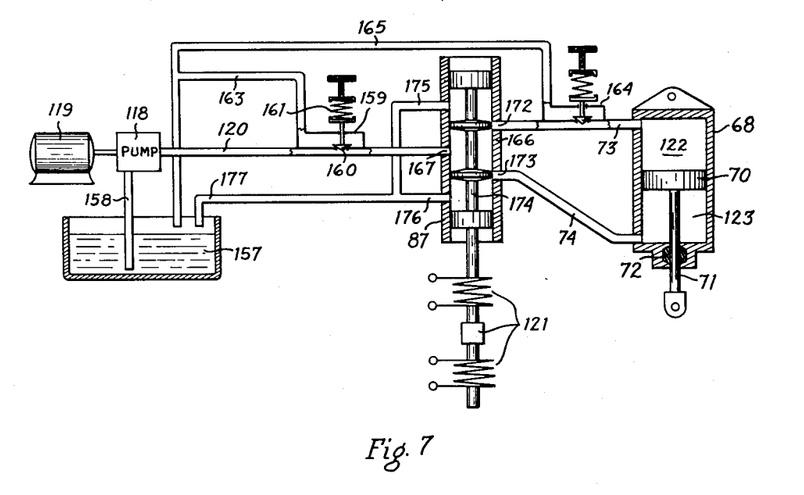
FIG. 7 is a diagram showing the hydraulic system of the box compressing mechanism.

The hydraulic circuit is shown in FIG. 7 from which the operation may be traced. The pump 118 driven by the motor 119 withdraws hydraulic fluid from a sump 157 through a suction line 158 and feeds liquid under high pressure through the hydraulic supply line 120 to the control valve 87. The pressure prevailing in line 120 is high, preferably of the order of 2000 pounds, and is maintained at a preset magnitude by a high pressure regulator 159 whose valve member 160 is under the action of a spring 161. The tension of the spring may be adjusted by a screw 162. If the pressure in the line 120 exceeds the preset operating pressure, the valve member 160 opens and permits liquid to return to the sump 157 through the return duct 163.

A similar pressure regulator 164 controls the pressure in the low pressure line 73. This pressure is used for opening the jaws of the pressure applicator and may for this reason be of a lesser magnitude of the order of 175 pounds. A return duct 165 returns fluid from the low pressure regulator to the sump.

The valve 87 comprises a valve housing 166 having an inlet port 167. Control ports 172 and 173 at which lines 73 and 74 terminate are controlled by the movable valve member 174 which may be moved up and down by the solenoid 121. Return lines 175 and 176 lead to the sump at 177.

When the solenoid 121 moves the valve member 174 downwardly, fluid under high pressure enters the lower chamber 123 of the hydraulic servo-motor 68 and the piston 70 moves upwardly while fluid is displaced out of chamber 122 and flows through line 73, the control valve 87 and return lines 175, 177 back to the sump 157. This phase of the operation represents the compression stroke of the box compressing device. The box and the plunger are released by movement of the piston 70 in the opposite direction. For this purpose the valve member 174 is moved in an upward direction causing fluid under pressure to flow from line 120 through the valve, control port 172, line 173, into the upper chamber 122 of the servo-motor 68. The pressure of the fluid entering the chamber 122 is reduced to a preset value, for example 155 pounds per square inch, by the regulator 164 from which excess fluid is bled off through return line 165.

The piston 70 now moves downwardly and causes fluid to be displaced from chamber 123. This fluid flows through line 74, the valve 87 and thence through duct 176, 177, back to the sump 157. Because of the small mass of the moving parts of the hydraulic mechanism, and the short stroke of the servo-motor 68, the actuation of the pressure applying mechanism is very quick and precise, and at the same time capable of exerting tremendous forces.

What is claimed is:

1. A device for exerting compressive force on adhesively connected areas of folding boxes, the device comprising, in combination, a substantially rectangular frame having rear, side, and front portions; a pair of levers pivotally mounted on the rear portion of the frame and extending towards the front portion; a pressure fluid servo-motor including a cylinder, and a piston movable within the cylinder, the cylinder being connected to one of said levers, the piston being connected to the other lever, the servo-motor being located in the front portion of the frame; a box forming plunger movable into and out of the central space of said frame; a pair of pressure elements facing said plunger, one element being connected to one lever, the other element being connected to the other lever intermediate said rear portion and said servo-motor; an equalizing member pivotally mounted on the front portion of the frame; a pair of connecting rods extending from said element to said levers; and means for periodically admitting fluid under pressure into said cylinder to one side of the piston and the other, respectively.

2. A device for exerting compressive force on adhesively connected areas of folding boxes, the device comprising, in combination, a substantially rectangular frame having rear, side, and front portions; a pair of levers pivotally mounted on the rear portion of the frame and extending towards the front portion; a pressure fluid servo-motor including a cylinder, and a piston movable within the cylinder, the cylinder being connected to the front end of one of said levers, the piston being connected to the front end of the other lever, the servo-motor being located in the front portion of the frame; a box forming plunger movable into and out of the central space of the frame; a pair of pressure jaws facing said plunger from opposite sides, one jaw being connected to one lever, the other jaw being connected to the other lever intermediate the rear and front ends of the lever; means forming parallel tracks in said frame for guiding said elements with freedom to move towards, and away from, each other; an equalizing member mounted on the front portion of the frame on a central pivot, said member having lateral pivots on opposite sides of the central pivot; a first connecting rod extending from one of said lateral pivots to one of said levers; and a second connecting rod extending from the other lateral pivot to the other lever; and means for periodically admitting fluid under pressure into said cylinder to one side of said piston and the other side, respectively.

3. A device for exerting compressive force on adhesively connected areas of folding boxes, the device comprising, in combination, a substantially rectangular frame having rear, side, and front portions; a pair of levers pivotally mounted on the rear portion of the frame and extending towards the front portion; a pressure fluid servo-motor including a cylinder, and a piston movable within the cylinder, the cylinder being connected to the front end of one of said levers, the piston being connected to the front end of the other lever, the servo-motor being located in the front portion of the frame; a box forming plunger movable into and out of the central space of the frame; a pair of guide rods extending from one side portion of the frame to the other substantially at right angles to said levers; a pair of pressure jaws slidable on said guide rods, one jaw being connected to one lever intermediate its rear pivot and its front end, the other jaw being connected to the other lever intermediate its rear pivot and its front end, said jaws facing said plunger from opposite sides; an equalizing member mounted on the front portion of the frame on a central pivot, said member having lateral pivots on opposite sides of the central pivot; a first connecting rod extending from one of said lateral pivots to the front end of one of said levers and a second connecting rod extending from the other lateral pivot to the front end of the other lever; and means for supplying fluid under pressure into said cylinder alternately to one side of the piston and the other side.

4. A compression die for exerting compressive force on adhesively connected areas of folding boxes, the device comprising, in combination, a support including a pair of rear pivots; a pair of lateral levers mounted with their rear ends on said pivots, said levers and a portion of the support between said pivots constituting three sides of a quadrangle; a box forming plunger movable into and out of, the central space of the quadrangle; a pressure element mounted on each of said levers intermediate the lever ends, said pressure elements facing the plunger from opposite sides to clamp a plunger-supported folding box between the elements by movement of the levers towards each other; a pressure fluid servo-motor comprising a cylinder connected to the front end of one of the levers and a piston connected to the front end of the other lever, said servo-motor being unattached to, and free to move relatively to, said support and lying within the fourth side of the quadrangle; and motion equalizing means mounted on said support and interconnecting said levers for centering the levers with respect to the plunger axis.

5. A compression die for exerting compressive force on adhesively connected areas of folding boxes, the device comprising, in combination, a support including a pair of rear pivots; a pair of lateral levers mounted with their rear ends on said pivots, said levers and a portion of the support between said pivots constituting three sides of a quadrangle; a box forming plunger movable into and out of, the central space of the quadrangle; a pressure element mounted on each of said levers intermediate the lever ends, said pressure elements facing the plunger from opposite sides to clamp a plunger-supported folding box between the elements by movement of the levers towards each other; a pressure fluid servo-motor comprising a cylinder connected to the front end of one of the levers and a piston connected to the front end of the other lever, said servo-motor being unattached to, and free to move relatively to, said support and lying within the fourth side of the quadrangle; motion equalizing means mounted on said support and interconnecting said levers for centering the levers with respect to the plunger; a source of fluid under high pressure; a source of fluid under lower pressure than said first source; means controlled by the plunger motion for admitting fluid under high pressure into said cylinder in a direction to move said levers towards each other; means controlled by the plunger motion for admitting fluid under low pressure into said cylinder in a direction to separate said pressure elements; and adjustable stop means for limiting the opening movement of said levers.

6. A compression die for exerting compressive force on adhesively connected areas of folding boxes, the device comprising, in combination, a support including a pair of rear pivots; a pair of lateral levers mounted with their rear ends on said pivots, said levers and a portion of the support between said pivots constituting three sides of a quadrangle; a box forming plunger movable into and out of, the central space of the quadrangle; a pressure element mounted on each of said levers intermediate the lever ends, said pressure elements facing the plunger from opposite sides to clamp a plunger-supported folding box between the elements by movement of the levers towards each other; a pressure fluid servo-motor comprising a cylinder connected to the front end of one of the levers and a piston connected to the front end of the other lever, said servo-motor being unattached to, and free to move relatively to, said support and lying within the fourth side of the quadrangle; motion equalizing means mounted on said support and interconnecting said levers for centering the levers with respect to the plunger; and means controlled by the plunger for alternately supplying fluid under pressure to said servo-motor to one side of the piston and the other.

References Cited in the file of this patent
UNITED STATES PATENTS

| | | |
|---|---|---|
| 1,651,200 | Goss | Nov. 29, 1927 |
| 2,341,602 | Dewey | Feb. 15, 1944 |
| 2,389,526 | Maulding | Nov. 20, 1945 |